July 21, 1970    F. R. MERRIAM    3,521,096

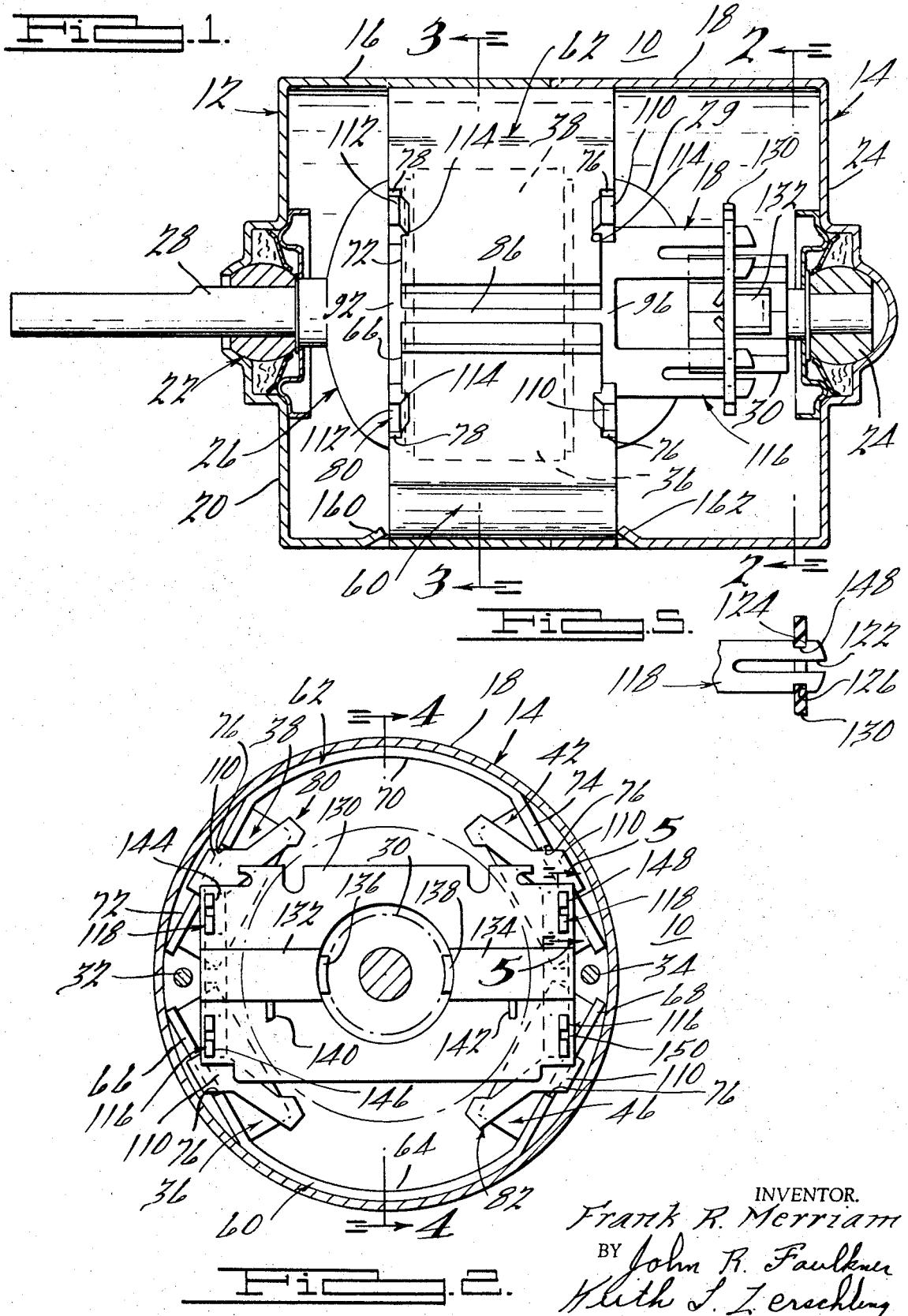

PERMANENT MAGNET DYNAMOELECTRIC MACHINE STRUCTURE

Filed Oct. 14, 1968    3 Sheets-Sheet 2

INVENTOR.
Frank R. Merriam
BY John R. Faulkner
Keith L. Zerschling
ATTORNEYS

INVENTOR.
Frank R. Merriam
BY John R. Faulkner
Keith L. Zerschling
ATTORNEYS.

United States Patent Office 3,521,096
Patented July 21, 1970

1

3,521,096
PERMANENT MAGNET DYNAMOELECTRIC MACHINE STRUCTURE
Frank R. Merriam, Plymouth, Mich., assignor to Ford Motor Company, Dearborn, Mich., a corporation of Delaware
Filed Oct. 14, 1968, Ser. No. 767,233
Int. Cl. H02k *21/26*
U.S. Cl. 310—154                                    25 Claims

ABSTRACT OF THE DISCLOSURE

A permanent magnet dynamoelectric machine structure in which a plurality of permanent magnets, preferably of the flat block type construction, are employed to provide the field for the machine. Ferromagnetic flux return path means are positioned within the machine and engage the permanent magnets for providing a return flux path. The permanent magnets and the return flux path means are held in assembled relationship by a fastening means, preferably in the form of plastic clip members. These plastic clip members may also have resilient axially extending tongues that hold the brush card of the machine in proper position so that the brushes properly engage the commutator of the machine.

BACKGROUND OF THE INVENTION

The prior art is replete with permanent magnet type dynamoelectric machines in which various mechanisms are employed to hold the magnets within a housing to provide a field for an armature rotatably mounted within the housing. Various clip devices have been employed in the prior art to hold the permanent magnets in assembled position and to provide a means for holding a brush card in proper position so that the brushes of the machine may engage the commutator of the armature. U.S. Pat. 2,456,701 and 2,971,107 disclose typical structures for holding and positioning permanent magnets in a dynamoelectric machine to provide a field structure. These patents also disclose means for holding the brush card in proper relationship in the housing of the machine. These devices and structures shown in these patents are typical of the prior art structures known to the applicant.

The present invention provides an improved structure for holding flat block type permanent magnets and flux return path means for the magnets within the housing of a dynamoelectric machine. This structure may also include means for holding a brush card in a proper position in the machine. The three elements mentioned above, the flat block permanent magnets, the flux return path means, and the brush card, may all be held in assembled position prior to insertion into the housing by means of a pair of novel plastic clip members.

SUMMARY OF THE INVENTION

This invention relates to a permanent magnet dynamoelectric machine structure in which the field of the machine is provided by a plurality of flat permanent magnets. Flux return path means, preferably in the form of ferromagnetic strips each having flat end portions and an intermediate arcuate portion, are positioned in engagement with the permanent magnets by means of a novel fastening means. This novel fastening means, preferably is in the form of a pair of plastic clip members each of which has receptacles complementary in shape to the shape of the permanent magnets. The permanent magnets are received in the receptacles and the flat portions of the ferromagnetic strips are held by the clip members in engagement with a flat surface of each of the magnets. Means are provided on the two clip members to hold the two ferromagnetic flux return path means in both an axial and circumferential direction.

In addition, each of the clip means may include a pair of axially extending resilient tongues which include outer notches. These tongues are positioned through complementary slots in the brush card and the notches in the tongues engage the end walls of the slots in the brush card to properly position the brush card and hold it rigidly in position.

The housing of the machine may comprise a pair of cup-shaped housing members each of which has a substantially cylindrical sidewall. The inner diameter of these sidewalls is substantially equal to the outer diameter of the opposed arcuate portions of the ferromagnetic flux return path means so that the assembly of the permanent magnets, the ferromagnetic flux return path means and the brush card held in assembled relationship by the clip members may be press-fitted within the cup-shaped housing. Each cup-shaped housing may have radially inwardly extending tabs that engage the edges of the arcuate portions of the ferromagnetic flux return path means to properly position the assembly axially within the machine.

It can be appreciated that the above described structure is uncomplicated, is easy to assemble and provides an efficient field structure for a dynamoelectric machine. Moreover, it provides a means for holding a brush card for a permanent magnet dynamoelectric machine in proper position within the housing of the machine.

An object of the invention is the provision of a permanent magnet dynamoelectric machine structure which is uncomplicated, efficient and easy to assemble.

Another object of the invention is the provision of an easily assembled and uncomplicated field structure for a dynamoelectric machine.

A further object of the invention is the provision of an efficient, uncomplicated field structure for a dynamoelectric machine that employes flat block type permanent magnets.

Other objects and attendant advantages of the present invention may be more readily realized as the specification is considered in connection with the drawings.

BRIEF DESCRIPTION OF THE DRAWINGS

FIG. 1 is a longitudinal sectional view, partially in elevation, of the permanent magnet dynamoelectric machine of the present invention.

FIG. 2 is a sectional view, partially in elevation, taken along the lines 2—2 of FIG. 1.

FIG. 5 is a sectional view, partially in elevation, taken along the lines 5—5 of FIG. 2.

DESCRIPTION OF THE PREFERRED EMBODIMENT

Figure 3:
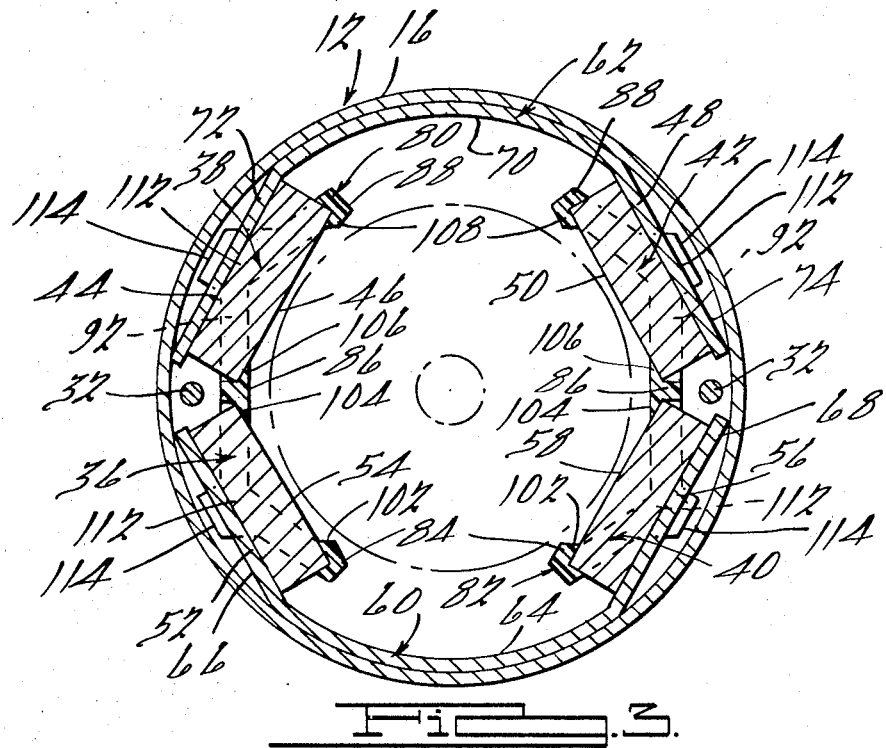
FIG. 3 is a sectional view with the armature of the machine removed, taken along the lines 3—3 of FIG. 1.

Referring now to the drawings in which like reference numerals designate like parts through out the several views thereof, there is shown in FIGS. 1 and 2 a permanent magnet dynamoelectric machine 10 which includes a first cup-shaped housing member 12 and a second cup-shaped housing member 14 each of which have cylindrical sidewalls 16 and 18, respectively. The endwall 20 of the cup-shaped housing member 12 has a permanently lubricated bearing 22 mounted therein while the endwall 24 of the cup-shaped housing member 14 has a similar permanently lubricated bearing 24 mounted therein.

An armature 26 has a shaft 28 mounted for rotation in the bearings 22 and 24. This armature is of conventional construction and includes a wound portion 29 and a commutator 30. The two cup-shaped housing members 12 and 14 may be held together by conventional through bolts which are shown in cross section in FIG. 2 at 32 and 34. As can best be seen by reference to FIGS. 2, 3 and 5, the field for the dynamoelectric machine is provided by the plurality of flat permanent magnets 36, 38, 40 and 42. These flat permanent magnets are preferably of rectangular configuration and are polarized in a radial direction with respect to the axis of the dynamoelectric machine so that a north pole is positioned on one of the major surfaces thereof and a south pole is positioned on the other major surface thereof. For example, the surface 44 of permanent magnet 38 may be a north pole while the surface 46 thereof may be a south pole, and the surface 48 of permanent magnet 42 may be a south pole while the surface 50 thereof may be a north pole. Similarly, the surface 52 of permanent magnet 36 may be a north pole while the surface 54 may be a south pole, and the surface 56 of permanent magnet 40 may be a south pole and the surface 58 may be a north pole. This arrangement will provide for proper flux paths through the wound portion 29 of the armature 26 by providing a south magnetic pole at the left side of the armature 26 as viewed in FIG. 3 and a magnetic north pole at the right-hand side of the armature. The permanent magnets 36, 38, 40 and 42 may be constructed of any suitable material, but are preferably of the sintered ceramic type.

A pair of flux return path means in the form of strips 60 and 62 of ferromagnetic material, preferably steel, are provided to complete the field structure. The ferromagnetic strip 60 includes a central arcuate portion 64 and a pair of flat end portions 66 and 68, while the ferromagnetic strip 62 comprises a central arcuate portion 70 and a pair of flat end portions 72 and 74. Each of the flat end portions 66, 68, 72 and 74 is provided with a pair of opposed shoulders 76 and 78 that extend in an axial direction with respect to the axis of the dynamoelectric machine.

The permanent magnets 36, 38, 40 and 42 and the flux return path means in the form of ferromagnetic strips 60 and 62 are held in assembled relationship by suitable fastening means, preferably in the form of a pair of plastic clip means or members generally designated by the numerals 80 and 82. Each of these plastic clip means has three spaced parallel struts or walls 84, 86 and 88 that extend in a direction generally parallel to the axis of the machine and the armature 26, and they are joined by transversely extending end struts or walls 90 and 92 to form receptacles 94, 96, 98 and 100. Each receptacle has inwardly extending means for preventing radially inward movement of the permanent magnets and these may take the form of inwardly extending ledges 102 positioned on strut or wall 84, inwardly extending ledges 104 and 106 positioned on middle strut or wall 86, and inwardly extending ledge 108 formed on strut or wall 88. The permanent magnet 36 is positioned within receptacle 98, the permanent magnet 38 is positioned within receptacle 100, the permanet magnet 40 is positioned within receptacle 94 and the permanent magnet 42 is positioned within receptacle 96.

Each receptacle is provided with an outwardly extending tab 110 formed integrally with transverse wall 90 and an opposed outwardly extending tab 112 formed integrally with transverse wall 92. Each tab has an axially inwardly extending ledge or shoulder 114.

Figure 6:
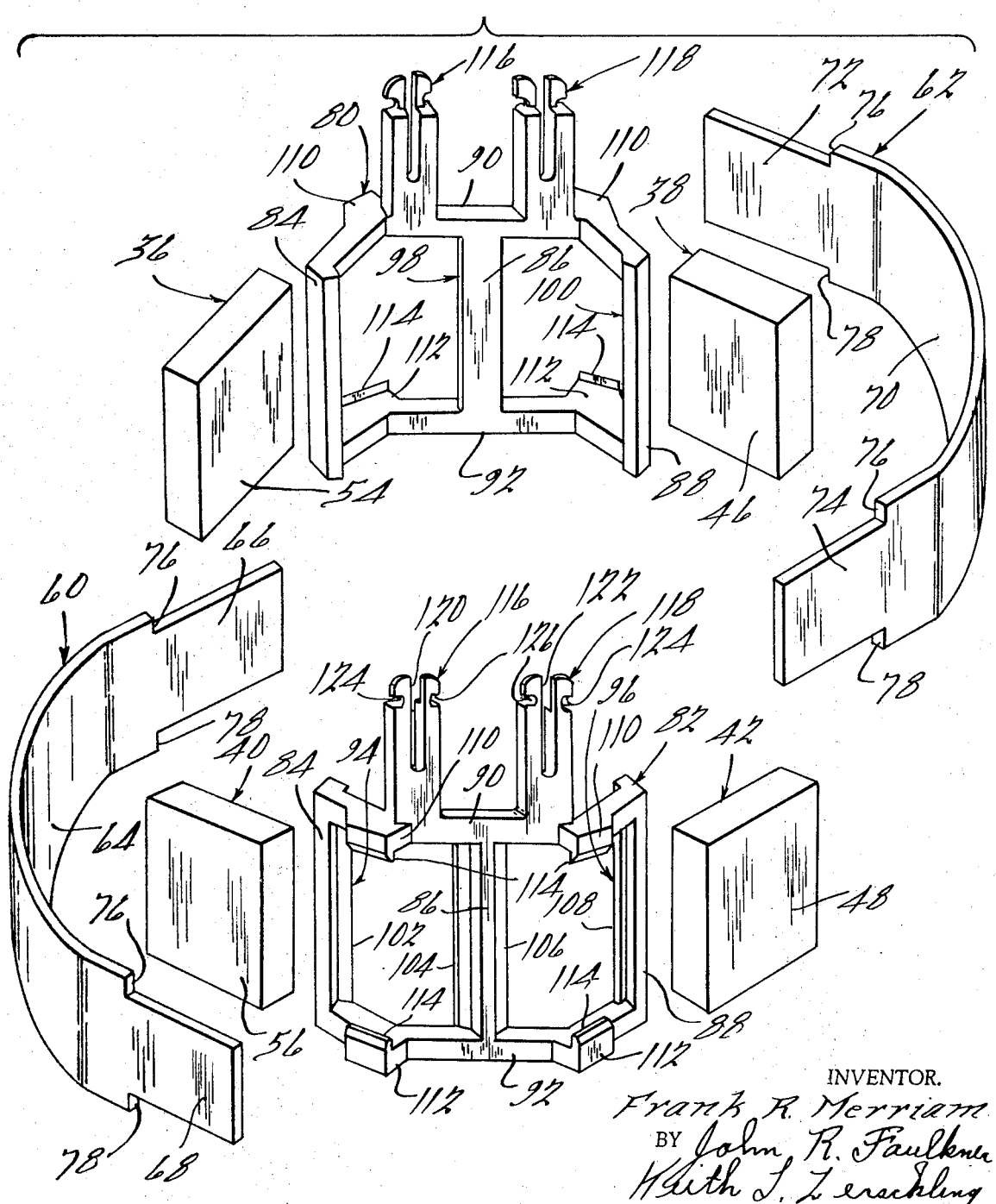
FIG. 6 is an exploded view showing the field structure and the fastening members for the dynamoelectric machine of the present invention.

Each of the plastic clip means or members 80 and 82 is provided with a pair of integrally formed and axially extending legs or tongues 116 and 118 that are integrally formed with the transverse wall 90 and are bifurcated by means of axially extending slots 120 and 122, respectively. Each of the tongues 116 and 118 has opposed notches 124 and 126 positioned therein, as best shown in FIGS. 5 and 6.

The dynamoelectric machine of the present invention includes a conventional brush card 130 having opposed brush containers 132 and 134 mounted thereon and a pair of brushes 136 and 138 are mounted within the brush containers 132 and 134, respectively, for engagement with the armature 30. The brush 136 is suitably connected to a lead 140 while the brush 138 is suitably connected to a lead 142. These leads are connected to an external source of electrical energy for operating the dynamoelectric machine when it is operated as a motor.

The brush card, brush container and brush construction described above is conventional and may be of the form more fully shown and described in U.S. Pat. 3,089,047, issued to C. J. Perzyk on May 7, 1963 and assigned to the assignee of this application. The brush card 130 has four rectangular shaped openings or slots at 144, 146, 148 and 150 and the slot 148 may be more fully seen by reference to FIG. 5.

Figure 4:
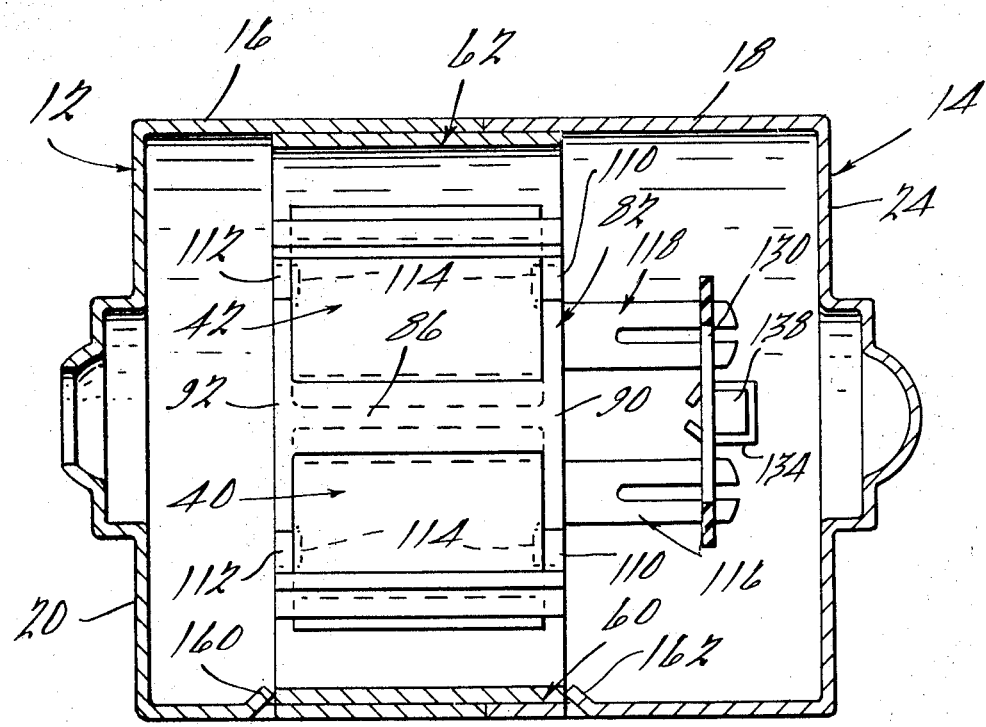
FIG. 4 is a longitudinal sectional view, partially in elevation, in which the armature of the machine is removed, taken along the lines 4—4 of FIG. 2.

The substantially cylindrical wall 16 of cup-shaped housing 12 has a plurality of radially inwardly extending tabs or protrusions 160 positioned therein and the substantially cylindrical wall 18 of cup-shaped housing 14 has a plurality of radially inwardly extending tabs or protrusions 162 struck therein as can best be seen by reference to FIGS. 1 and 4.

In the assembly of the structure of the present invention, the permanent magnets 36, 38, 40 and 42 are positioned in and are confined by the receptacles 98, 100, 94 and 96, respectively, in the plastic clip members 80 and 82. Inward radial movement of the permanent magnets is prevented by the inwardly extending means or ledges 102, 104, 106 and 108. Axial movement of the magnets is prevented by the engagement of the magnets with the end or transverse walls 90 and 92 and with the tabs 110 and 112. The flat portions 66, 68, 72 and 74 of the ferromagnetic flux return means 60 and 62 are then positioned over their respective permanent magnets so that the axially extending means 114 on the tabs 110 and 112 are positioned over the outer surface of these flat portions and force the inner surface of these flat portions into tight engagement with their respective permanent magnets thereby completing a field structure for the dynamoelectric machine.

The brush card 130 is then positioned on the plastic clip means 80 and 82 by insertion of the axially extending legs or tongues 116 and 118 on each of the clip means or members 80 and 82 through the slots 144, 146, 148 and 150 in the brush card 130 so that the edges of these slots are positioned within the opposed notches 124 and 126 of each of the axially extending tongues or legs 116 and 118 as can best be seen by reference to FIG. 5. The axially extending slot 120 positioned in the axially extending tongue or leg 116 and the axially extending slot 122 positioned in the axially extending tongue or leg 118 permit these tongues to be compressed in a lateral direction as they are forced through the slots 144, 146, 148 and 150 in the brush card. This assembly is then press-fitted into the cup-shaped housing 12 and it can be appreciated by an inspection of FIGS. 2 and 3 that the inner diameter of the cylindrical wall 116 of the cup-shaped housing member 12 is substantially equal to the outer diameter defined by the arcuate portions 64 and 70 of the ferromagnetic flux return path means 60 and 62, respectively. The radially inwardly extending tabs or protrusions 160 positioned in the cylindrical wall 16 of the cup-shaped housing 12 limit the axial movement of the assembly into the cup-shaped housing 12 by engaging the side of the arcuate shaped portions 64 and 70 of the ferromagnetic flux return path means 60 and 62.

It can be appreciated by an inspection of FIG. 2 that the axially extending shoulders 76 and 78 on the ends 66, 68, 72 and 74 of the flux return path means 60 and 62 engage the tabs 110 and 112 to provide a stop means for radial inward movement of the flux return path means 60 and 62. As a result, the above mentioned press-fit between the arcuate portions 64 and 70 of the flux return path means 60 and 62 with the inner portion of cylindrical walls 16 and 18 of cup-shaped housing members 12 and 14 is properly maintained.

The armature 26 of the machine may then be inserted into the cup-shaped housing 12 so that shaft 28 is positioned properly in bearing 22. Subsequently, the cup-shaped housing 14 is forced over the assembly to the position as shown in FIGS. 1 and 4 where the radially inwardly extending tabs or protuberances 162 positioned in the substantially cylindrical wall 18 are in engagement with the other side of the arcuate portions 64 and 70 of the ferromagnetic flux return path means 60 and 62, respectively.

The conventional through bolts 32 may then be inserted into the machine to hold the cup-shaped housing members 12 and 14 in engagement to complete the machine.

The dynamoelectric machine may then be placed in a fixture and a magnetic field applied to the machine to properly magnetize the permanent magnets. This procedure, of course, is optional since the magnets may be magnetized prior to the assembly of the machine.

It can readily be appreciated from the description and the drawings that the present invention provides a permanent magnet dynamoelectric machine construction including a field structure which is efficient, is uncomplicated and is easy to assemble. The magnetic circuit of the field structure is very efficient since the end portions of the flux return path means are positioned firmly in engagement over the whole area of one of the flat surfaces of each of the permanent magnets. This provides a low reluctance magnetic circuit in the air gap of the flux return path means thereby minimizing losses and increasing efficiency. In addition, an uncomplicated means is provided for holding the brush card of the machine in proper position. Moreover, the use of the flat block type permanent magnets permits the use of fastening means engaging the inwardly axially extending edges of the magnets since these edges are radially spaced from the circumferential surface of the armature of the machine. It can readily be appreciated that this is not the case when arcuate shaped permanent magnets are used since these edges of the magnets are in close spaced relationship with respect to the circumference of the armature.

The invention disclosed will have many modifications which will be apparent to those skilled in the art in view of the teachings of this specification. It is intended that all modifications which fall within the true spirit and scope of this invention be included within the scope of the appended claims.

What is claimed is:

1. A permanent magnet dynamoelectric machine comprising four flat permanent magnets, two ferromagnetic return flux path members, and a pair of resilient plastic clip means for holding said four flat permanent magnets and said two ferromagnetic return flux path members in assembled relationship.

2. The combination of claim 1 in which each of said clip means has a pair of openings complementary in shape to the shape of said flat permanent magnets, one of said flat permanent magnets being positioned in each of said openings.

3. The combination of claim 2 in which each of said clip means includes means extending into said openings for restraining movement of said permanent magnets radially inwardly toward the axis of the dynamoelectric machine.

4. The combination of claim 3 in which said two ferromagnetic return flux path members each comprise a central arcuate portion and a flat portion at each end of said arcuate portion, each of said flat portions being positioned in engagement with the outer flat surface of a permanent magnet, and means on said clip means and engaging each flat portion of said ferromagnetic flux return path members for holding each of said flat portions in engagement with the outer flat surface of a permanent magnet.

5. The combination of claim 4 in which said means on said clip means comprise a pair of axially spaced tabs extending outwardly from said clip means adjacent each of said permanent magnets, the axial spacing between each of said tabs of each of said pairs being substantially equal to the axial dimension of each of said flat surfaces of said ferromagnetic return flux path members and each of said tabs has an axial portion extending inwardly toward its complementary tab, said axially extending portions engaging the outer surface of each of said flat portions of said ferromagnetic flux return path means.

6. The combination of claim 5 in which a pair of axially extending shoulders are positioned on each of said flat surfaces of said ferromagnetic flux return path means, each of said shoulders engaging one of said tabs.

7. The combination of claim 6 in which said dynamoelectric machine comprises a cup-shaped housing member with a substantially cylindrical sidewall, and the arcuate portions of said ferromagnetic flux return path members are positioned in opposed relationship between said pair of clip means, the inner diameter of said substantially cylindrical sidewall being substantially equal to the outer diameter of the arcuate portions of said ferromagnetic flux return path means whereby the assembly of said flat permanent magnets, said two ferromagnetic return flux path means and said two clip means may be press-fitted into said cup-shaped housing member.

8. The combination of claim 7 in which said substantially cylindrical sidewall of said cup-shaped housing has a plurality of radially inwardly extending tabs engaging the edges of said arcuate portions of said ferromagnetic flux path means for limiting the axial movement of the assembly of said flat permanent magnets, said two ferromagnetic flux return path means and said two clip means as the assembly is inserted into said cup-shaped housing member.

9. The combination of claim 8 in which said two clip means each have a pair of axially extending tongues and said dynamoelectric machine has a brush card adapted to position brushes in engagement with the commutator of the machine, said brush card having a plurality of slots positioned therein, one of said axially extending tongues extending through each of said slots and having means positioned thereon engaging said brush card for holding said brush card in position in said dynamoelectric machine.

10. The combination of claim 9 in which said dynamoelectric machine includes a second cup-shaped housing having a substantially cylindrical sidewall, the inner diameter of said substantially cylindrical sidewall being substantially equal to the outer diameter of the arcuate portions of said ferromagnetic flux return path means whereby the assembly of said flat permanent magnet, said two ferromagnetic return flux path means, said two clip means and said brush card may be press-fitted into said second cup-shaped housing member.

11. The combination of claim 10 in which said substantially cylindrical sidewall of said second cup-shaped housing has a plurality of radially inwardly extending tabs engaging the edges of said arcuate portions of said ferromagnetic flux return path means for limiting the axial movement of the assembly of said flat permanent magnets, said two ferromagnetic flux return path means, said two clip members and said brush card as the assembly is inserted into said second cup-shaped housing member.

12. A permanent magnet dynamoelectric machine comprising a plurality of permanent magnets each of which is of rectangular flat-block configuration, flux return path means for said permanent magnets, said flux return path means including a pair of ferromagnetic members, each of said members comprising a central arcuate portion and generally flat end portions, one of the end portions of each of said ferromagnetic members engaging a flat surface on one of said permanent magnets, a brush card adapted to position a pair of brushes in contact with the armature of the machine, fastening means having openings complementary in shape to said permanent magnets forming receptacles receiving said permanent magnets, said fastening means coupled to said permanent magnets, said flux return path means and said brush card for positioning and holding said permanent magnets, said return flux path means and said brush card in assembled relationship, said fastening means including outwardly extending tabs engaging the end walls of said permanent magnets and the side walls of said generally flat portions of said ferromagnetic members, said tabs having axially extending means extending axially with respect to the armature of the machine and engaging a surface of the flat portions of said ferromagnetic members opposite the surface that engages said permanent magnets, said fastening means also including axially extending means, and said brush card having a plurality of slots, each of said axially extending means including resilient snap means that may be forced through said slots for rigidly holding said brush card.

13. The combination of claim 12 in which said axially extending means are each bifurcated in an axial direction forming a pair of resilient legs which may be compressed as the axially extending means are forced through the slots in said brush card and each of said legs includes an outwardly extending notch engaging the end walls of the slots in said brush card.

14. A permanent magnet dynamoelectric machine comprising a plurality of permanent magnets each of which is of rectangular flat-rock configuration, flux return path means for said permanent magnets, said flux return path means including a pair of ferromagnetic members, each of said members comprising a central arcuate portion and generally flat end portions, one of the end portions of each of said ferromagnetic members engaging a flat surface on one of said permanent magnets, a brush card adapted to position a pair of brushes in contact with the armature of the machine, fastening means having openings complementary in shape to said permanent magnets forming receptacles receiving said permanent magnets and coupled to said permanent magnets, said flux return path means and said brush card in assembled relationship, a cup shaped housing having a cylindrical side wall, the cylindrical side wall having an inner diameter substantially equal to diameter of the arc defined by the two arcuate portions of said ferromagnetic members whereby the assembly of said permanent magnets, said ferromagnetic members and said brush card may be press fitted within said cup shaped housing.

15. A permanent magnet dynamoelectric machine comprising a plurality of flat permanent magnets, two ferromagnetic return flux path members, and a pair of resilient plastic clip means for holding said plurality of flat permanent magnets and said two ferromagnetic return flux path members in assembled relationship.

16. The combination of claim 15 in which each of said clip means has an opening complementary in shape to the shape of said flat permanent magnets, one of said flat permanent magnets being positioned in said opening.

17. The combination of claim 16 in which each of said clip means includes means extending into said opening for restraining movement of said permanent magnet radially inwardly toward the axis of the dynamoelectric machine.

18. The combination of claim 17 in which said two ferromagnetic return flux path members each comprise a central arcuate portion and a flat portion at each end of said arcuate portion, each of said flat portions being positioned in engagement with the outer flat surface of a permanent magnet, and means on said clip means and engaging each flat portion of said ferromagnetic flux return path members for holding each of said flat portions in engagement with the outer flat surface of a permanent magnet.

19. The combination of claim 18 in which said means on said clip means comprise a pair of axially spaced tabs extending outwardly from said clip means adjacent each of said permanent magnets, the axial spacing between each of said tabs of each of said pairs being substantially equal to the axial dimension of each of said flat surfaces of said ferromagnetic return flux path members and each of said tabs has an axial portion extending inwardly toward its complementary tab, said axially extending portions engaging the outer surface of each of said flat portions of said ferromagnetic flux return path means.

20. The combination of claim 18 in which a pair of axially extending shoulders are positioned on each of said flat surfaces of said ferromagnetic flux return path means, each of said shoulders engaging one of said tabs.

21. The combination of claim 20 in which said dynamoelectric machine comprises a cup-shaped housing member with a substantially cylindrical sidewall, and the arcuate portions of said ferromagnetic flux return path members are positioned in opposed relationship between said pair of clip means, the inner diameter of said substanially cylindrical sidewall being substantially equal to the outer diameter of the arcuate portions of said ferromagnetic flux return path means whereby the assembly of said flat permanent magnets, said two ferromagnetic return flux path means and said two clip means may be press-fitted into said cup-shaped housing member.

22. The combination of claim 21 in which said substantially cylindrical sidewall of said cup-shaped housing has a plurality of radially inwardly extending tabs engaging the edges of said arcuate portions of said ferromagnetic flux path means for limiting the axial movement of the assembly of said flat permanent magnets, said two ferromagnetic flux return path means and said two clip means as the assembly is inserted into said cup-shaped housing member.

23. The combination of claim 22 in which said two clip means each have a pair of axially extending tongues and said dynamoelectric machine has a brush card adapted to position brushes in engagement with the commutator of the machine, said brush card having a plurality of slots positioned therein, one of said axially extending tongues extending through each of said slots and having means positioned thereon engaging said brush card for holding said brush card in position in said dynamoelectric machine.

24. The combination of claim 23 in which said dynamoelectric machine includes a second cup-shaped housing having a substantially cylindrical sidewall, the inner diameter of said substantially cylindrical sidewall being substantially equal to the outer diameter of the arcuate portions of said ferromagnetic flux return path means whereby the assembly of said flat permanent magnet, said two ferromagnetic return flux path means, said two clip means and said brush card may be press-fitted into said second cup-shaped housing member.

25. The combination of claim 24 in which said substantially cylindrical sidewall of said second cup-shaped housing has a plurality of radially inwardly extending tabs engaging the edges of said arcuate portions of said ferromagnetic flux return path means for limiting the axial movement of the assembly of said flat permanent magnets, said two ferromagnetic flux return path means, said two clip members and said brush card as the assembly is inserted into said second cup-shaped housing member.

References Cited

UNITED STATES PATENTS

| | | | |
|---|---|---|---|
| 2,456,701 | 12/1948 | Hansen | 310—154 |
| 2,971,107 | 2/1961 | Jin | 310—239 |
| 3,089,047 | 5/1963 | Perzyk | 310—239 |
| 3,138,728 | 6/1964 | Videtic | 310—239 |

FOREIGN PATENTS

| | | |
|---|---|---|
| 198,829 | 1/1958 | Austria. |
| 923,477 | 4/1963 | Great Britain. |

MILTON O. HIRSHFIELD, Primary Examiner

R. SKUDY, Assistant Examiner

U.S. Cl. X.R.

310—71, 89, 91, 239